(12) United States Patent
Förnbacher et al.

(45) Date of Patent: Oct. 26, 2004
(10) Patent No.: US 6,808,190 B2

(54) WHEEL SUSPENSION OF A MOTOR VEHICLE

(75) Inventors: Joachim Förnbacher, Steinheim-Kleinbottwar (DE); Achim Hespelt, Spiegelberg (DE)

(73) Assignee: DaimlerChrysler AG, Stuttgart (DE)

(*) Notice: Subject to any disclaimer, the term of this patent is extended or adjusted under 35 U.S.C. 154(b) by 79 days.

(21) Appl. No.: 10/218,723

(22) Filed: Aug. 13, 2002

(65) Prior Publication Data

US 2003/0038441 A1 Feb. 27, 2003

(30) Foreign Application Priority Data

Aug. 23, 2001 (DE) .......................... 101 41 441

(51) Int. Cl.[7] .................................. B62D 7/18
(52) U.S. Cl. .................................. 280/93.512
(58) Field of Search .............. 280/93.512, 93.511, 280/93.513, 93.51

(56) References Cited

U.S. PATENT DOCUMENTS 4,690,418 A * 9/1987 Smith .................... 280/93.512
5,192,100 A 3/1993 Rumpel et al.
6,607,203 B2 * 8/2003 Bodin .................... 280/93.512

FOREIGN PATENT DOCUMENTS

DE 27 15 143 10/1978
DE 198 32 384 11/1999

* cited by examiner

Primary Examiner—Faye M. Fleming
(74) Attorney, Agent, or Firm—Kenyon & Kenyon

(57) ABSTRACT

A wheel suspension of a motor vehicle includes a wheel carrier which is connected to the vehicle body via wheel-guiding and wheel-steering components and which carries, by rolling-bearing mounting, at least one wheel via a wheel hub. For this purpose, the wheel carrier includes a vehicle-body-side and a wheel-side wheel-carrier part. The vehicle-body-side and the wheel-side wheel-carrier parts are connected via a sliding joint or pivot joint so as to be movable relative to one another, the wheel-carrier parts having a preferential position in relation to one another. The direction of relative movement between the vehicle-body-side and the wheel-side wheel-carrier part extends approximately in the direction of travel or in the opposite direction to the direction of travel. Moreover, between the wheel-carrier parts elements are arranged which reverse the joint movement and which return the wheel-carrier parts in the direction of the preferential position.

19 Claims, 4 Drawing Sheets

WHEEL SUSPENSION OF A MOTOR VEHICLE

CROSS-REFERENCE TO RELATED APPLICATIONS

The present application claims priority to application Ser. No. 101 41 441.2, filed in the Federal Republic of Germany on Aug. 23, 2001, which is expressly incorporated herein in its entirety by reference thereto.

FIELD OF THE INVENTION

The invention relates to a wheel suspension of a motor vehicle, with a wheel carrier which is connected to the vehicle body via wheel-guiding and wheel-steering components and which, by rolling-bearing mounting, carries at least one wheel via a wheel hub.

BACKGROUND INFORMATION

In the event of operations for the acceleration and braking of a motor vehicle, longitudinal forces act on the individual wheels. Moreover, during driving on a, for example, uneven road, shocks occur on the wheels. These are generally absorbed in elastomeric elements which are usually arranged where the wheel suspension is fastened to the vehicle body. The damping of these elastomeric elements determines the longitudinal spring comfort of the vehicle. In this case, the entire vehicle axis is often shifted in the longitudinal direction of the vehicle. At the same time, during acceleration and braking, the level of the vehicle body is changed, the toe-in of the vehicle being influenced. In this case, the angle of the wheels to the direction of travel may change and the tire wear may increase.

German Published Patent Application No. 198 32 384 describes an individual wheel suspension, in which a sliding pivot joint with a swing arm having two approximately vertically oriented pivot axes is arranged between the wheel carrier and a semi-trailing arm. During braking, the individual wheel is pivoted about the pivot axes and brings about a change in the toe-in in a specific manner.

It is an object of the present invention to provide a wheel suspension which increases the driving comfort of a vehicle in the event of shocks on the wheels during acceleration and deceleration operations and reduces the tire wear.

SUMMARY

The above and other beneficial objects of the present invention are achieved by providing a wheel suspension as described herein.

According to the present invention, the wheel carrier includes a vehicle-body-side and a wheel-side wheel-carrier part. The vehicle-body-side and the wheel-side wheel-carrier part are connected movably relative to one another via a sliding or a pivot joint, the wheel-carrier parts having a preferential position in relation to one another. The direction of the relative movement between the vehicle-body-side and the wheel-side wheel-carrier part extends approximately in the direction of travel or in the direction opposite to the direction of travel. Moreover, between the wheel-carrier parts elements are arranged which reverse the joint movement and which return the wheel-carrier parts in the direction of the preferential position.

Sliding or pivot joints are arranged between the vehicle-body-side and the wheel-side wheel carrier. Shock forces and longitudinal forces acting from outside and caused, for example, by longitudinal accelerations or longitudinal decelerations of the vehicle induce a relative movement of the parts of the wheel carrier in relation to one another. In this case, these parts move out of a preferential position and, when the positive or negative acceleration decreases, are returned into a preferential position relative to one another again by returning elements, for example spring/damper elements. The relative movement takes place approximately in the direction of travel. The toe-in of the individual wheel may be thereby maintained during the deflection of the sliding or pivot joint. The wear of the tires is not increased.

Longitudinal forces due to accelerations and shock forces are absorbed in the sliding or pivot joints between the vehicle-body-side and the wheel-side parts of the wheel carrier. The longitudinal spring comfort and driving comfort are thereby increased. During the absorption of the forces, only the wheel, together with part of its wheel suspension, may be moved, and the axle maintains its position on the vehicle body. There is no need for elastomeric elements for absorbing these longitudinal forces between the wheel suspension and the vehicle body.

This wheel suspension may be used in the case of both driven and non-driven wheels on front and rear axles and also with various axle configurations, such as, for example, a composite link axle, a semi-trailing arm axle, etc.

The direction of the relative movement may take place both in the direction of travel and in the direction opposite to the direction of travel, depending on the load on the individual wheel.

Acceleration forces are applied in the wheel contact area of the motor vehicle. They act on the sliding and/or pivot joints as a moment with the lever arm corresponding to the distance between the wheel contact area and the guide element nearest to the wheel contact area.

Shock forces, which act on the wheel, for example, when the vehicle drives over a deep pothole, take effect as a momentum on the wheel. They are applied at least approximately parallel to the road along the wheel-center transverse plane.

A sliding joint may comprise, for example, two linear guides parallel to one another. The play of the sliding joint is then smaller, due to the double guide, than in the case of a single guide.

A pivot joint may include a ball joint. When the wheel is loaded by a shock force or acceleration force, this joint remains at a fixed location with respect to both parts of the wheel carrier.

If one of the guides or a joint is below the wheel rotation axis, this, in particular, may be subjected to load during acceleration operations. If, for example, it has a higher rigidity than a second guide arranged at a higher level, as a result of acceleration forces, the load leads to a pivoting movement about the lower guide or the lower joint. The position of the wheel contact area may be approximately maintained in relation to the joint. The flexibility of the sliding or pivot joint under this load is insignificant.

In this case, when shock forces take effect, both the upper guide and the lower guide are subjected to load. The rigid lower guide is compressed to a lesser extent than the softer upper guide. The wheel rotation axis creeps rearwards in relation to the wheel contact area. The flexibility of the sliding or pivot joint under this load is high.

DETAILED DESCRIPTION

Figure 1:
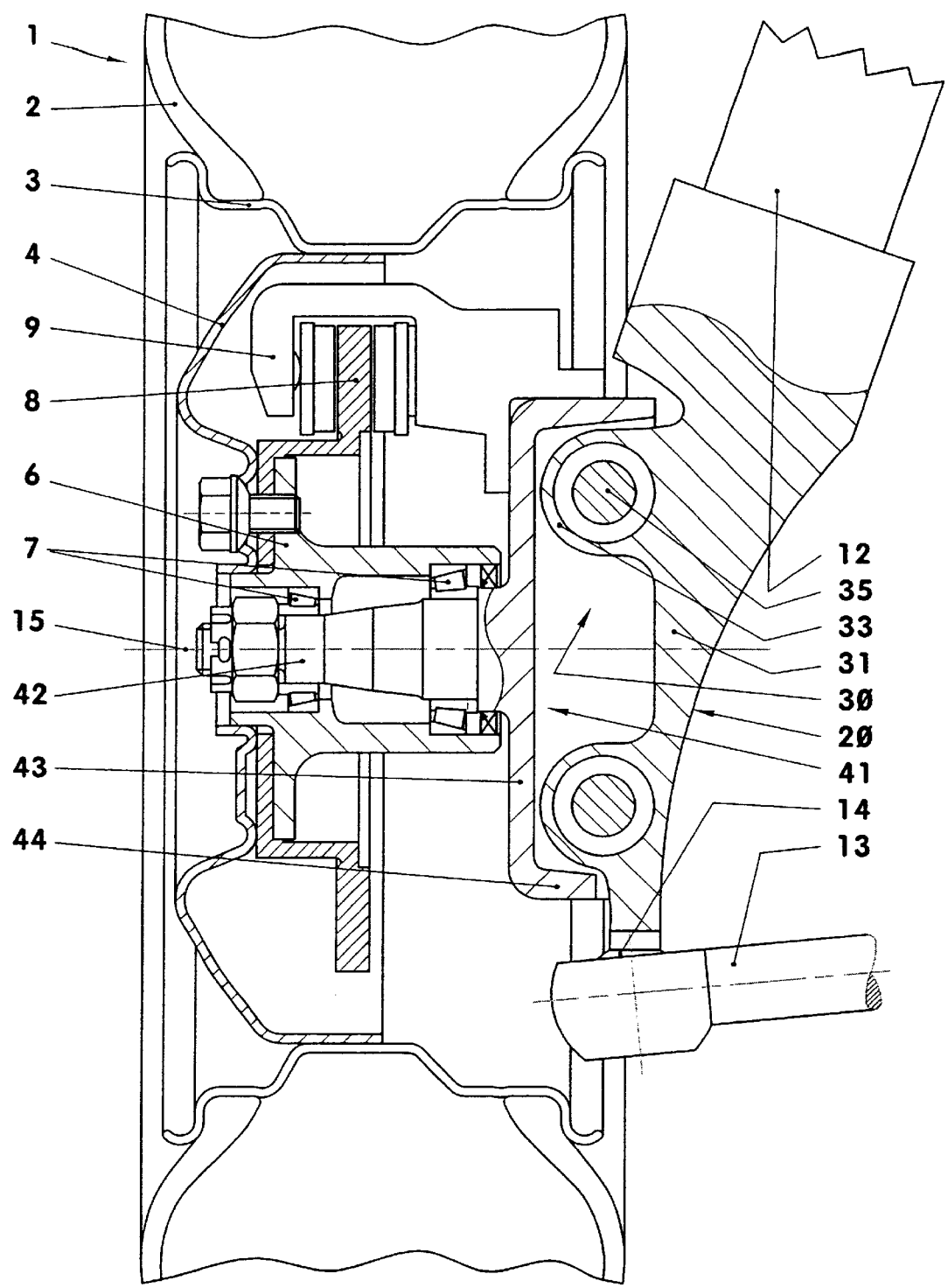
FIG. 1 is a cross-sectional view of a wheel suspension on a non-driven axle with a sliding joint.
Figure 2:
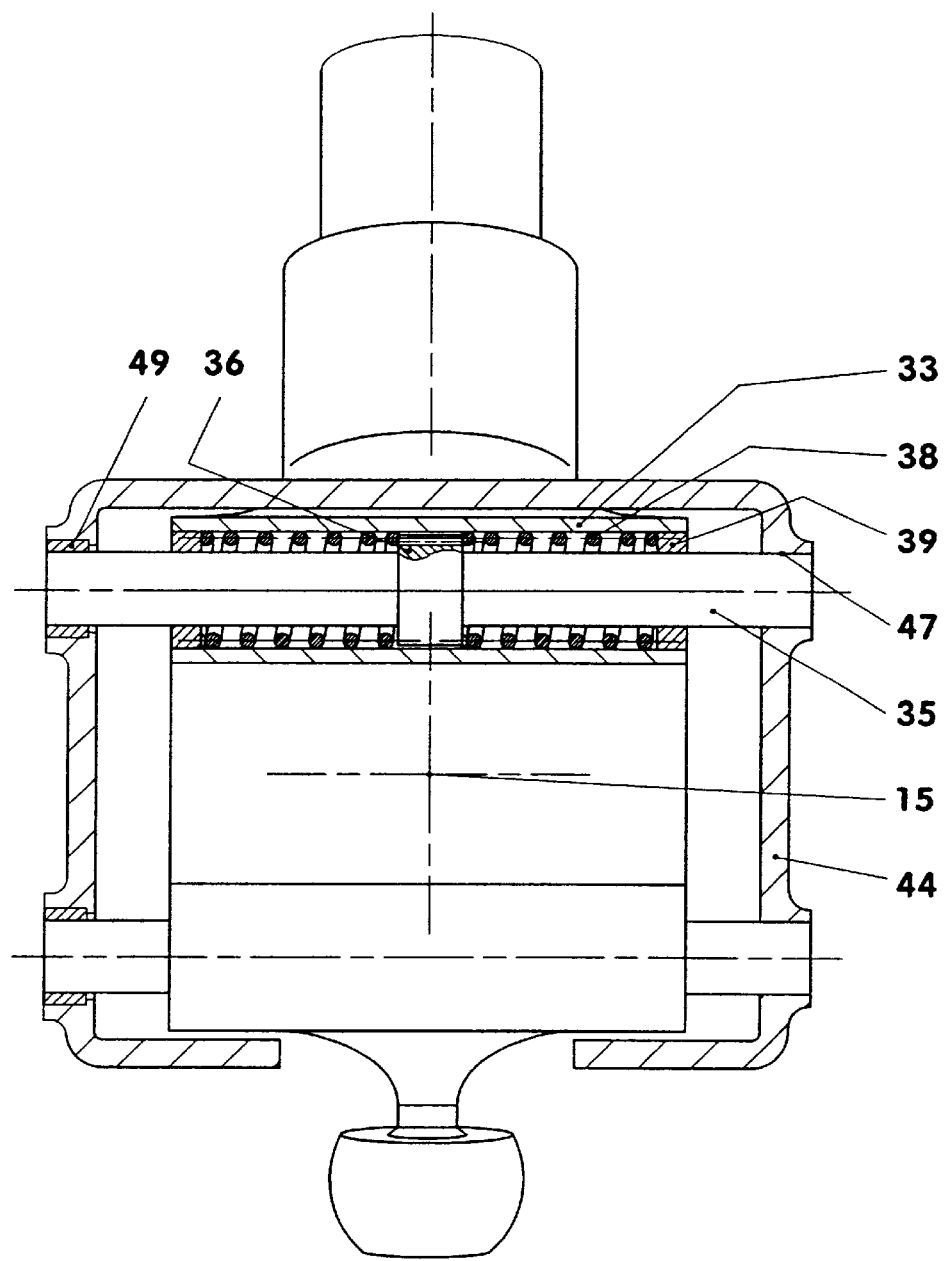
FIG. 2 is a partial cross-sectional of the wheel suspension illustrated in FIG. 1.

FIGS. 1 and 2 illustrate a wheel suspension of a non-driven axle of a motor vehicle with a sliding joint 30. FIG. 1 in this case illustrates, for example, the view of a left-hand wheel suspension in the direction of travel, while FIG. 2 illustrates a part-section through the sliding joint 30, as viewed in the direction of the vertical vehicle longitudinal mid-plane.

The wheel suspension includes a wheel carrier 20. The latter is supported on the vehicle body via wheel-guiding and wheel-steering components 12, 13. The component 12 is, for example, a spring strut and the component 13 a lower transverse link. The latter may be connected to the wheel carrier 20 via a ball joint 14. A wheel 1 may be supported on the wheel carrier 20 via a wheel hub 6 and a rolling-bearing mounting 7. For this purpose, a rim 3 having a tire 2 may be fastened to the wheel hub 6. Moreover, a brake disc 8, which may be surrounded by a floating brake calliper 9 with brake linings, is seated on the wheel hub 6.

The wheel carrier 20 illustrated in FIGS. 1 and 2 includes a vehicle-body-side 31 and a wheel-side 41 wheel-carrier part. These two parts 31, 41 are connected to one another via, for example, a multi-part sliding joint 30.

The vehicle-body-side wheel-carrier part 31 is, for example, a forging which is connected fixedly to the spring strut 12. On a side oriented towards the outside of the vehicle, the vehicle-body-side wheel-carrier part 31 has, for example, two guide sleeves 33 parallel to one another. These are arranged one above the other, approximately parallel to the road, and, for example when the wheel 1 is running straight ahead, parallel to the vertical wheel longitudinal mid-plane. The upper of the guide sleeves 33 is in this case, for example, above the wheel rotation axis 15, and the lower of the guide sleeves 33 is arranged below the wheel rotation axis 15, for example, at the same distance from the latter.

Inserted in each of the guide sleeves 33 is a guide rod 35. This is, for example, a cylindrical rod which centrally has a piston 36. A compression spring 38, for example a helical spring, is arranged on each of the two sides of this piston 36. The free ends of the compression springs 38 are supported in each case on a sliding piece 39. These sliding pieces 39 are fastened in the guide sleeves 33 and have a minimum radial play in relation to the guide rods 35.

The wheel-side wheel-carrier part 41 includes a wheel-carrier journal 42 and a wheel-carrier flange 43 which, for example, is forged onto the latter. The wheel-carrier journal 42 has various stepped diameter regions. Seated on it are the inner rings of the rolling-bearing mounting 7 and a nut bracing the rolling-bearing mountings 7.

The wheel-carrier flange 43 includes a vertically arranged approximately rectangular frame 44. This frame 44 may also be configured as a fork. Located in the frame 44, on each of the two vertical sides opposite one another, are two bores 47, in which, for example, a mounting sleeve 49 is inserted at least on one side. Two of these bores 47 in each case have a common axis. The bores 47 are arranged one above the other, for example, in a plane parallel to the vertical wheel longitudinal mid-plane. The vertical distance between the axes of the bores 47 corresponds to the vertical distance between the axes of the guide sleeves 33.

During assembly, after the vehicle-body-side wheel-carrier part 31 has been inserted into the wheel-carrier flange 43, the guide rods 35, together with the mounting sleeves 49, are fastened in the wheel-carrier flange 43.

The sliding joint 30 allows a relative movement between the vehicle-body-side 31 and the wheel-side 41 parts of the wheel carrier 20. In the position of rest, for example, the compression springs 38 arranged at the front and at the rear in the direction of travel are subjected to an equal load. The vehicle-body-side wheel-carrier part 31 is held virtually centrally in the frame 44. This position forms a preferential position of the sliding joint 30.

During acceleration of the vehicle, the non-driven axle is pulled along by the vehicle body. Due to the mass inertia of the wheel parts and brake parts, these parts creep rearwardly, opposite to the direction of travel, via the wheel-carrier flange 43 in the sliding joint 30. The compression springs 38 arranged at the rear in the direction of travel are compressed and the compression springs 38 arranged at the front in the direction of travel are relieved. Since the guides of the sliding joint 30 are linear, the individual wheel 1 maintains its toe-in and its toe-in angle during this relative movement. After the end of the acceleration operation, the compression springs 38 return the wheels 1 in relation to the vehicle body again, so that the sliding joint assumes at least approximately its preferential position.

A driven axle pulls or pushes the vehicle body with it during the acceleration of the vehicle. Due to the mass inertia of the vehicle body, the individual driven wheel 1 creeps forwardly in the direction of travel in relation to the vehicle body.

During the braking of the vehicle, a brake force applied to the brake disc 8 decelerates the wheels 1, while the vehicle body, due to its mass inertia, continues to pull in the direction of travel. On all the wheels 1, the vehicle-body-side wheel-carrier part 1 is displaced forwardly in the direction of travel in relation to the wheel-side wheel-carrier flange 43. In this case, the compression springs 38 located in each case at the front in the direction of travel are subjected to load, while the compression springs 38 arranged at the rear in the direction of travel are relieved. The respective wheel 1 creeps rearwardly in relation to the vehicle body along the sliding joint 30. If, for example, the compression spring 38 arranged below the wheel rotation axis 15 is more rigid than that arranged above the latter, where appropriate the compression spring 38 arranged below the wheel rotation axis 15 is subjected to a higher load than the compression spring 38 arranged above the wheel rotation axis 15. The wheel 1 then pivots about its wheel contact area. The flexibility of the sliding joint 30 is insignificant. The toe of the wheel 1 is maintained in this case. In order to limit the stroke of the relative movement in the sliding joint 30, for example, the compression springs 38 arranged in the compression direction during braking may be configured to be more rigid than those subjected to a lower load here.

The guides of the sliding joint 30 are configured in such a manner that, during acceleration and braking, a tilting of the guides is prevented. For this purpose, the guide length, here the distance between the sliding pieces 49, is large in relation to their width.

When the vehicle travels over, for example, a pothole, a shock force acts on the wheel 1. This shock force takes effect on the wheel 1 as a central momentum opposite to the direction of travel. In this case, the guides of the pivot joint are subjected to a uniform load. If, then, for example, the upper compression spring 38 is softer than the lower one, the wheel 1 pivots, for example, rearwardly about its wheel contact area. The toe of the wheel 1 is in this case maintained. Under this load, the sliding joint 30 has high flexibility.

Figure 3:
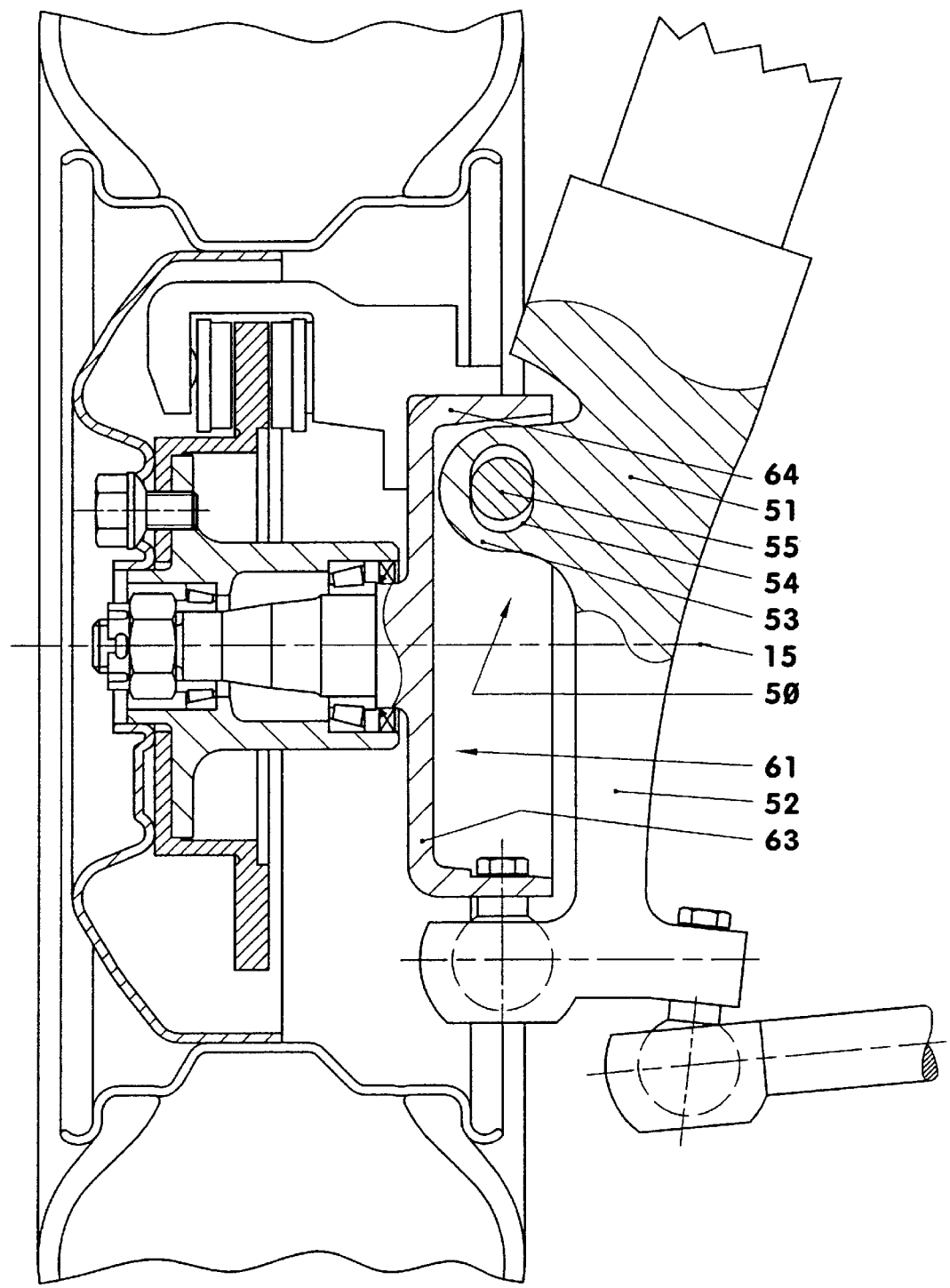
FIG. 3 is a cross-sectional view of a wheel suspension on a non-driven axle with a pivot joint.
Figure 4:
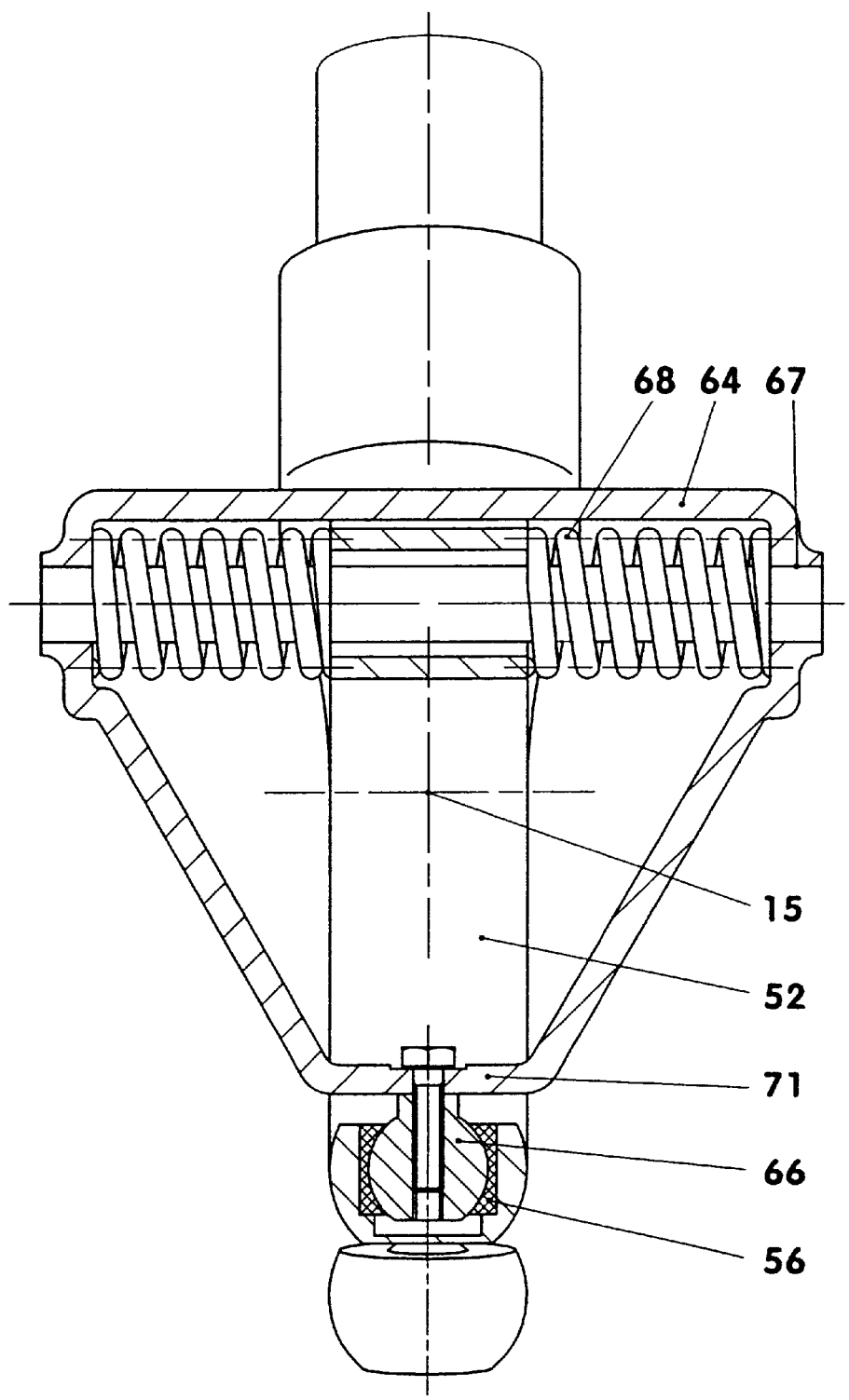
FIG. 4 is a partial cross-sectional of the wheel suspension illustrated in FIG. 3.

FIGS. 3 and 4 illustrate a wheel suspension with a pivot joint 50. FIG. 3 illustrates in this case, for example, the view of a left-hand wheel suspension in the direction of travel. FIG. 4 illustrates a section through this wheel suspension, level with the pivot joint 50, with a view in the direction of the vertical vehicle longitudinal mid-plane.

In this wheel suspension, the essential components surrounding the wheel carrier 20 correspond to the components described in connection with FIGS. 1 and 2.

The wheel carrier illustrated in FIGS. 3 and 4 includes a vehicle-body-side 51 and a wheel-side 61 wheel-carrier part. These two parts 51, 61 are connected to one another via a pivot joint 50.

The vehicle-body-side wheel-carrier part 51 carries, on a side oriented toward the outside of the vehicle, a guide element 53 with a long-hole bore 54. The latter is parallel to the road and, for example, parallel to the vertical wheel longitudinal mid-plane above the wheel rotation axis 15. Below the wheel rotation axis 15, the vehicle-body-side wheel-carrier part 51 has a projecting arm 52. A spherical cap 56 is inserted into this projecting arm 52 which, here, projects into the rim dish 4, cf. FIG. 4.

The spherical cap 56 in this case is, for example, in the same vertical vehicle longitudinal plane in which the guide element 53 also is arranged.

In this exemplary embodiment, too, the wheel-side wheel-carrier part 61 includes a wheel-carrier flange 63 directed toward the center of the vehicle. The wheel-carrier flange has an approximately trapezoidal vertically arranged frame 64, the short side 71 of which points downwardly. The side parts of the frame 64 are parallel to one another in the top third and taper downwards at an acute angle towards the short side 71. A bore 67 is arranged in each of the two side parts parallel to one another, the bores having a common axis and being congruent to one another. A spherical head 66 is screwed to the lower short side 71 of the frame 64, the spherical head 66 pointing downwardly. The bores 67 are above the wheel rotation axis 15 and the spherical head 66 is below the wheel rotation axis 15, in a common plane parallel to the vertical wheel longitudinal mid-plane.

During assembly, for example, first the wheel-side wheel-carrier part 61 is inserted with the spherical head 66 into the spherical cap 56 of the vehicle-body-side wheel-carrier part 51. Compression springs 68, for example helical springs, are inserted on both sides of the guide element 53. A guide rod 65 is then pushed through the bores 67 of the frame 64, the compression springs 68 and the guide element 53 and is secured in the frame 64 at least in the axial direction. In this case, the long hole 54 has a minimal play in relation to the guide rod 65 in the direction transverse to the vertical wheel longitudinal mid-plane.

The pivot joint 50 allows a vertical movement between the vehicle-body-side 51 and the wheel-side 61 part of the wheel carrier 20. In the position of rest, for example, the compression springs 68 arranged at the front and at the rear in the direction of travel are subjected to an equal load. This, for example, central position forms a preferential position of the pivot joint 50.

During an acceleration operation, on a non-driven axle the compression spring 68 arranged to the front in the direction of travel is subjected to load and the compression spring 68 arranged opposite to the direction of travel is relieved. The wheel-side wheel-carrier part 61 pivots a small amount, for example clockwise, in relation to the vehicle-body-side wheel-carrier part 51 about the ball joint 56, 66. The pivoting movement in this case takes place at least approximately opposite to the direction of travel. It takes place in a plane which contains the guide rod 65 and the ball joint 56, 66. The angle formed by the wheel 1 and the vertical vehicle longitudinal mid-plane thus remains constant. The toe angle of the wheel 1 does not change. After the acceleration of the vehicle, the compression spring 68 returns the pivot joint 50 in the direction of the preferential position.

In the case of a driven axle, during acceleration the compression spring 68 arranged at the rear in the direction of travel is subjected to load.

During braking, both on the driven and on the non-driven axle, the compression spring 68 in this case arranged at the front in the direction of travel is subjected to load. The brake force in this case has a lever arm corresponding to the distance between the wheel contact area and the ball joint 56. This moment leads only to a slight pivoting of the pivot joint 50. In order to limit the offset of the axle in relation to the vehicle body, the compression spring 68 arranged at the front in the direction of travel may be configured with high rigidity, e.g. in the case of the driven axle.

When a shock force occurs, the momentum acts in the wheel center counter to the direction of travel. The respective compression spring 68 located at the front in the direction of travel absorbs the momentum. The wheel is, in this case, pivoted about its wheel contact area. The pivot joint 50 has low flexibility under this load.

In the case of both the sliding joint 30 and the pivot joint 50, the steering forces acting on the wheel are supported over the guide length. In the sliding joint 30 illustrated, this is the distance between the sliding pieces 39, and, in the pivot joint 50 described, it is determined by the length of the guide element 53.

The sliding joint 30 or pivot joint 50 may be constructed differently. Thus, instead of the sliding joint 30 described, with two linear guides, a sliding joint 30 with another guide system which prevents a rotation of the guide and counter-guide parts about the longitudinal axis may also be provided. Also, the sliding joint 30 may be arranged, for example, obliquely or transversely to the road. The pivot joint 50 may be configured, for example, with a central bolt and with a helical spring. The pivot axis may also coincide with the wheel rotation axis 15.

For example, cup springs, helical springs, etc. may also be used instead of compression springs 38, 68 as returning elements. These may have, for example, different rigidities. Also, spring/damper elements, for example in the form of elastomeric elements, hydraulically acting elements, etc., may also be provided. Combinations of, for example, mechanical spring elements with hydraulic damper elements may also be provided. Thus, for example, in the exemplary embodiment illustrated in FIG. 2, the space closed and sealed off by the sliding pieces 39 may be filled with a hydraulic medium which, in the event of a movement of the vehicle-body-side wheel carrier 31 in relation to the wheel-side wheel carrier 41, is pressed through a longitudinal bore of the piston 36 of the guide rod 35. If appropriate, the rigidity of these returning elements may be adjustable, for example as a function of the driving conditions.

On the non-driven axle, only the compression spring 38, 68 located at the front in the direction of travel is subjected to load both during acceleration and during deceleration. It is therefore sufficient to use a compression spring 38, 68 only on the side located at the front in the direction of travel. If appropriate, a tension spring, for example in the form of a helical spring, which increases the spring rigidity of the returning element 38, 68, may be provided on the side located at the rear in the direction of travel.

During the relative movement of the wheel-carrier parts 31, 41, 51, 61 in the event of positive and negative accelerations, the angle of the corresponding wheel 1 to the vertical vehicle longitudinal mid-plane and therefore the toe-in or the toe-in angle remain constant, as seen perpendicularly to the road. If the direction of movement of the sliding joint 30 or pivot joint 50 is aligned parallel to the vertical wheel longitudinal mid-plane, during the relative movement the toe width of the wheels 1 located opposite one another changes. If the angle between the direction of movement of the sliding joint 30 or pivot joint 50 and the vertical vehicle longitudinal mid-plane is larger than the angle formed by the vertical wheel mid-plane and the vertical vehicle longitudinal mid-plane, the change in the toe width during the relative movement of the sliding joint 30 or pivot joint 50 is greater than in the arrangement mentioned above. This is avoided, for example, in an arrangement of the direction of movement to the sliding joint 30 or pivot joint 50 parallel to the vertical vehicle longitudinal mid-plane. In an arrangement of this type, during the relative movement of the wheel-carrier parts 31, 41, 51, 61 in relation to one another, both the toe-in and the toe width of the wheels 1 are maintained.

All the guide elements and parts may, for example, also be produced on a block which is arranged between the vehicle-body-side 31, 51 and the wheel-side 41, 61 wheel-carrier part.

List of Reference Symbols
1 Wheel
2 Tire
3 Rim
4 Rim dish
6 Wheel hub
7 Wheel mounting, rolling-bearing mounting
8 Brake disc
9 Floating brake calliper
12 Spring strut, wheel-steering component
13 Transverse link, wheel-steering component
14 Ball joint
15 Wheel rotation axis
20 Wheel carrier
30 Sliding joint
31 Vehicle-body-side wheel-carrier part
33 Guide sleeves
35 Guide rod, linear guide part
36 Piston
38 Returning elements, compression springs
39 Sliding pieces, linear guide part
41 Wheel-side wheel-carrier part
42 Wheel-carrier journal
43 Wheel-carrier flange
44 Frame
47 Bores
49 Mounting sleeve
50 Pivot joint
51 Vehicle-body-side wheel-carrier part
52 Projecting arm
53 Guide element
54 Long-hole bore
56 Spherical cap
61 Wheel-side wheel-carrier part
63 Wheel-carrier flange
54 Frame
65 Guide rod
66 Spherical head
67 Bore
68 Returning elements, compression springs
71 Side, short of (64)

What is claimed is:

1. A wheel suspension of a motor vehicle, comprising:
a wheel carrier connected to a vehicle body via wheel-guiding and wheel-steering components and configured to carry, by a roller-bearing mounting arrangement, at least one wheel via a wheel hub, the wheel carrier including:
a vehicle-body-side wheel-carrier part;
a wheel-side wheel-carrier part;
one of a sliding joint and a pivot joint, the vehicle-body-side wheel-carrier part and the wheel-side wheel-carrier part connected via the one of the sliding joint and the pivot joint to be relatively movable, the vehicle-body-side wheel-carrier part and the wheel-side wheel-carrier part having a preferential position in relation to one another, a direction of relative movement between the vehicle-body-side wheel-carrier part and the wheel-side wheel-carrier part extending one of approximately in a direction of vehicle travel and in a direction opposite to the direction of vehicle travel; and
elements arranged between the vehicle-body-side wheel-carrier part and the wheel-side wheel-carrier part configured to reverse joint movement and to return the vehicle-body-side wheel-carrier part and the wheel-side wheel-carrier part in a direction of the preferential position.

2. The wheel suspension according to claim 1, wherein the sliding joint includes two linear guides parallel to one another.

3. The wheel suspension according to claim 2, wherein at least one of the sliding joint, the pivot joint and at least one guide is arranged below a wheel rotation axis.

4. The wheel suspension according to claim 1, wherein the pivot joint includes a ball joint.

5. The wheel suspension according to claim 1, wherein a plane, oriented perpendicular to a road, through the direction of relative movement of the sliding joint and the pivot joint forms with a vertical vehicle longitudinal mid-plane an angle which is less than or equal to an angle formed by a vertical wheel mid-plane and the vertical vehicle longitudinal mid-plane.

6. The wheel suspension according to claim 1, wherein one of the sliding joint and the pivot joint is arranged parallel to a vertical vehicle longitudinal mid-plane.

7. The wheel suspension according to claim 1, wherein the elements arranged between the vehicle-body-side carrier part and the wheel-side wheel-carrier part are configured to return at least in one direction.

8. The wheel suspension according to claim 1, wherein the elements include at least one of elastically resilient elements and damping elements.

9. The wheel suspension according to claim 1, wherein the wheel is configured to maintain toe-in during relative movement between the vehicle-body-side wheel-carrier part and the wheel-side wheel-carrier part.

10. The wheel suspension according to claim 1, wherein the wheel-guiding component includes a spring strut.

11. The wheel suspension according to claim 1, wherein the elements arranged between the vehicle-body-side wheel-carrier part and the wheel-side wheel-carrier part include a first element and a second element, the first and second elements configured so that during relative movement between the vehicle-body-side wheel-carrier part and the wheel-side wheel-carrier part, one of the first and second elements is compressed and another of the first and second elements is relieved.

12. The wheel suspension according to claim 1, wherein the elements arranged between the vehicle-body-side wheel-carrier part and the wheel-side wheel-carrier part include a spring linearly moveable in the direction of vehicle travel and in the direction opposite to the direction of vehicle travel.

13. The wheel suspension according to claim 12, wherein the spring includes a helical spring.

14. The wheel suspension according to claim 1, wherein the wheel includes a driven wheel.

15. The wheel suspension according to claim 14, wherein, during a vehicle acceleration, the direction of movement of the wheel-side wheel-carrier part relative to the vehicle-body-side wheel-carrier part extends approximately in the direction of vehicle travel.

16. The wheel suspension according to claim 1, wherein the at least one wheel includes a non-driven wheel.

17. The wheel suspension according to claim 16, wherein, during a vehicle acceleration, the direction of movement of the wheel-side wheel-carrier part relative to the vehicle-body-side wheel-carrier part extends approximately in the direction opposite to the direction of vehicle travel.

18. The wheel suspension according to claim 1, wherein the direction of relative movement includes a linear component.

19. The wheel suspension of claim 1, wherein the direction of relative movement is approximately a linear direction of relative movement.

* * * * *